United States Patent
Smith et al.

(10) Patent No.: US 10,782,545 B2
(45) Date of Patent: Sep. 22, 2020

(54) LIQUID CRYSTAL PRIVATE DEVICE

(71) Applicant: Sharp Kabushiki Kaisha, Osaka (JP)

(72) Inventors: Nathan James Smith, Oxford (GB);
Andrew Acreman, Oxford (GB);
Hywel Hopkin, Oxford (GB); Takehiro Murao, Osaka (JP); Jiyun Yu, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 31 days.

(21) Appl. No.: 15/981,022

(22) Filed: May 16, 2018

(65) Prior Publication Data

US 2019/0353943 A1     Nov. 21, 2019

(51) Int. Cl.
| | |
|---|---|
| *G02F 1/1347* | (2006.01) |
| *G02F 1/13* | (2006.01) |
| *G02F 1/13363* | (2006.01) |
| *G02F 1/1335* | (2006.01) |
| *G09G 3/36* | (2006.01) |
| *G02F 1/1343* | (2006.01) |
| *G02F 1/13357* | (2006.01) |

(52) U.S. Cl.
CPC ........ *G02F 1/1323* (2013.01); *G02F 1/13363* (2013.01); *G02F 1/133514* (2013.01); *G02F 1/133528* (2013.01); *G02F 1/133603* (2013.01); *G02F 1/134309* (2013.01); *G09G 3/36* (2013.01); *G02F 2001/133541* (2013.01); *G02F 2001/133631* (2013.01); *G02F 2001/133638* (2013.01); *G02F 2001/134372* (2013.01); *G09G 2320/028* (2013.01); *G09G 2320/068* (2013.01)

(58) Field of Classification Search
CPC ................ G02B 5/3016; G02B 5/0242; G02B 27/2214; G02F 1/1323; G02F 1/133634; G02F 1/133711; C09K 19/32
USPC .......... 345/87; 349/17, 64, 74, 96, 123, 130; 428/1.1, 1.31
See application file for complete search history.

(56) References Cited

U.S. PATENT DOCUMENTS

| | | | |
|---|---|---|---|
| 5,831,698 A | 11/1998 | Depp et al. | |
| 5,877,829 A * | 3/1999 | Okamoto | ............... G02F 1/1323 349/74 |
| 6,211,930 B1 | 4/2001 | Sautter et al. | |

(Continued)

*Primary Examiner* — Abdul-Samad A Adediran
(74) *Attorney, Agent, or Firm* — Renner, Otto, Boisselle & Sklar, LLP

(57) ABSTRACT

A switchable view angle control device for a privacy view display system includes an electrically switchable view angle control LCD that is operable in a first state and a second state; a front polarizer located on a viewing side of the switchable view angle control LCD; and a polarized light source located on a non-viewing side of the switchable view angle control LCD that emits polarized light. When the switchable view angle control LCD in the first state, the view angle control device operates in a narrow angle view mode in which off-axis polarized light from the polarized light source is changed by the switchable view angle control LCD so that the off-axis light is absorbed by the front polarizer, and on-axis light passes through the switchable view angle control LCD and the front polarizer. When the switchable view angle control LCD is in the second state, the view angle control device operates in a wide angle view mode in which the polarized light from the polarized light source is scattered by the switchable view angle control LCD and passes through the front polarizer.

20 Claims, 14 Drawing Sheets

(56) References Cited

U.S. PATENT DOCUMENTS

| | | | |
|---|---|---|---|
| 9,720,266 B2 | 8/2017 | Su et al. | |
| 2001/0030726 A1* | 10/2001 | Yoshida | G02F 1/133634 |
| | | | 349/117 |
| 2005/0190329 A1* | 9/2005 | Okumura | G02F 1/1323 |
| | | | 349/123 |
| 2006/0035037 A1* | 2/2006 | Yoshizawa | C09K 19/32 |
| | | | 428/1.1 |
| 2007/0036917 A1* | 2/2007 | Hirakata | G02F 1/133711 |
| | | | 428/1.31 |
| 2007/0263152 A1* | 11/2007 | Mazaki | G02B 5/3016 |
| | | | 349/130 |
| 2009/0128746 A1* | 5/2009 | Kean | G02F 1/1323 |
| | | | 349/96 |
| 2009/0310064 A1* | 12/2009 | Choe | G02B 5/0242 |
| | | | 349/64 |
| 2010/0220043 A1* | 9/2010 | Broughton | G02F 1/1323 |
| | | | 345/87 |
| 2017/0069236 A1 | 3/2017 | Klippstein et al. | |
| 2017/0153383 A1 | 6/2017 | Lee et al. | |
| 2018/0205942 A1* | 7/2018 | Smith | G02B 27/2214 |

* cited by examiner

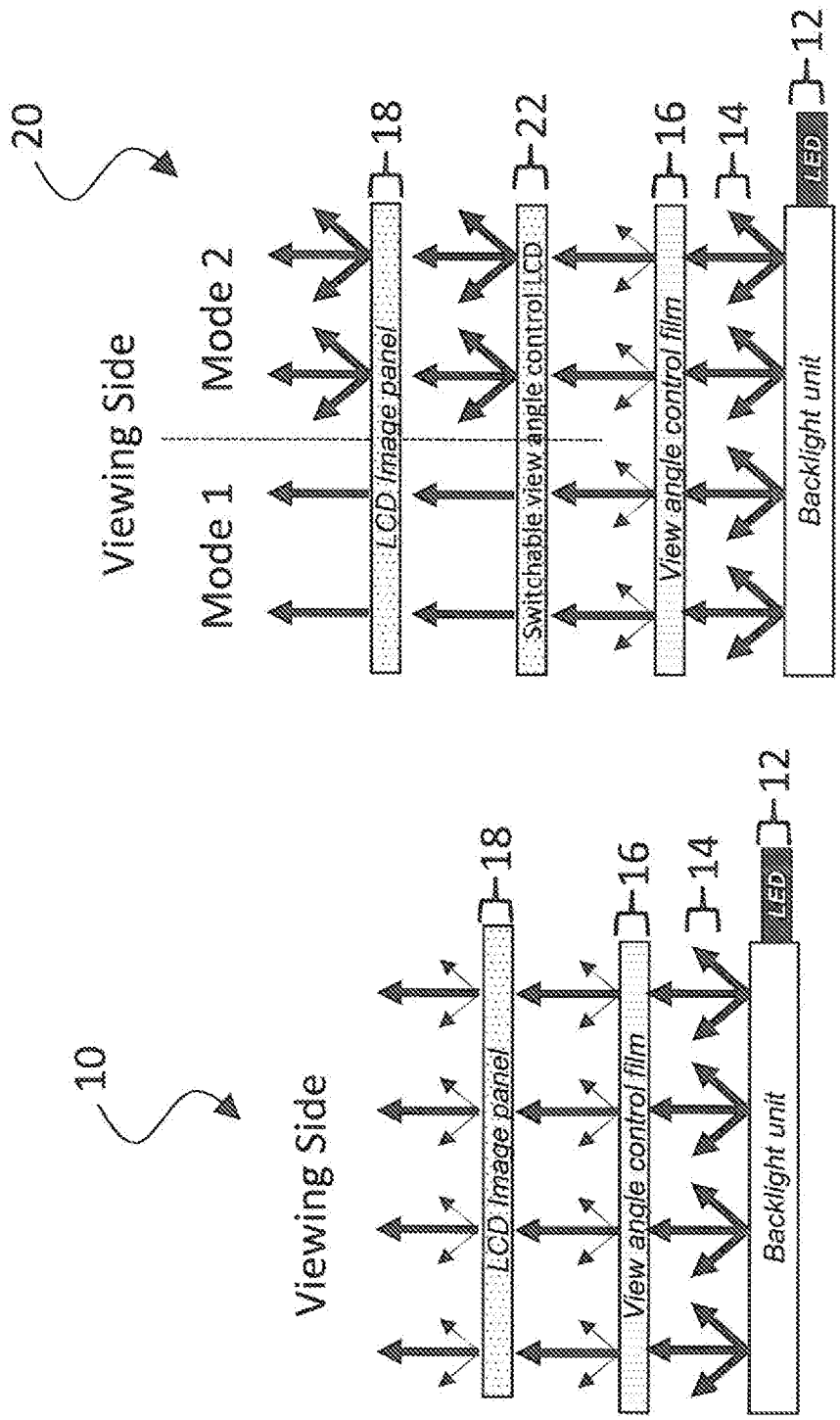

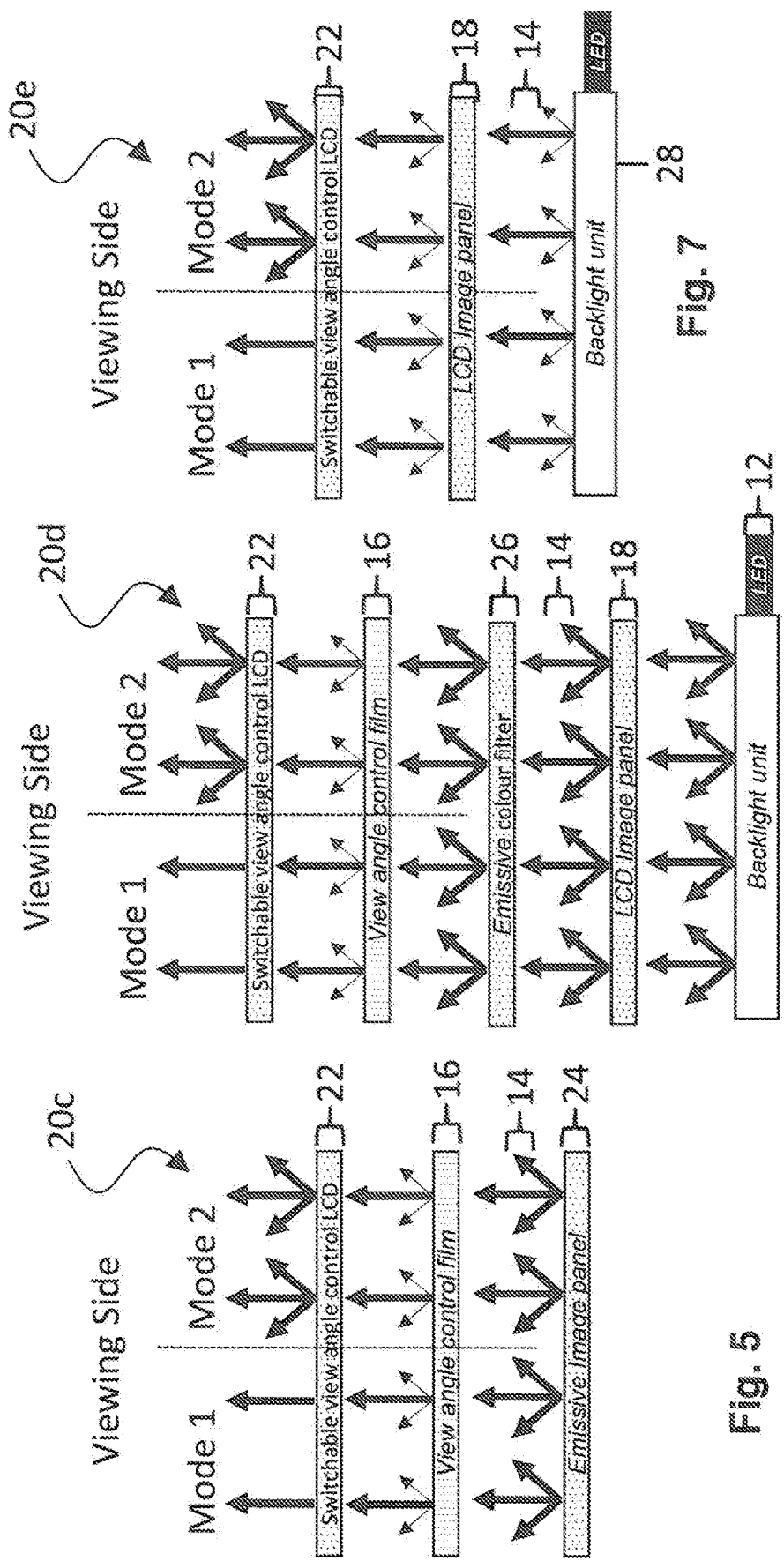

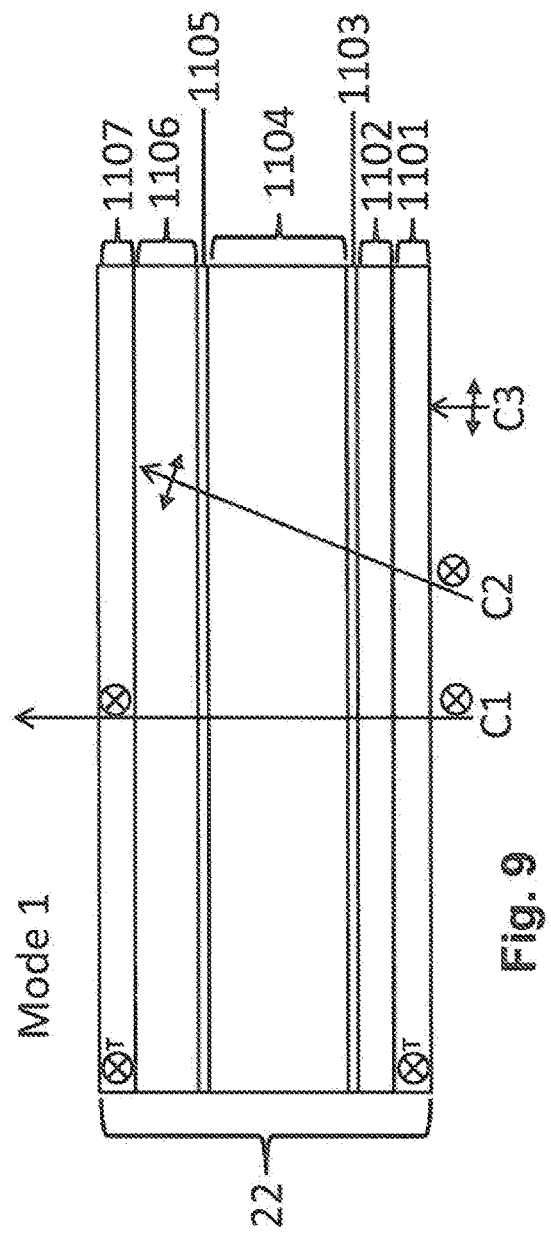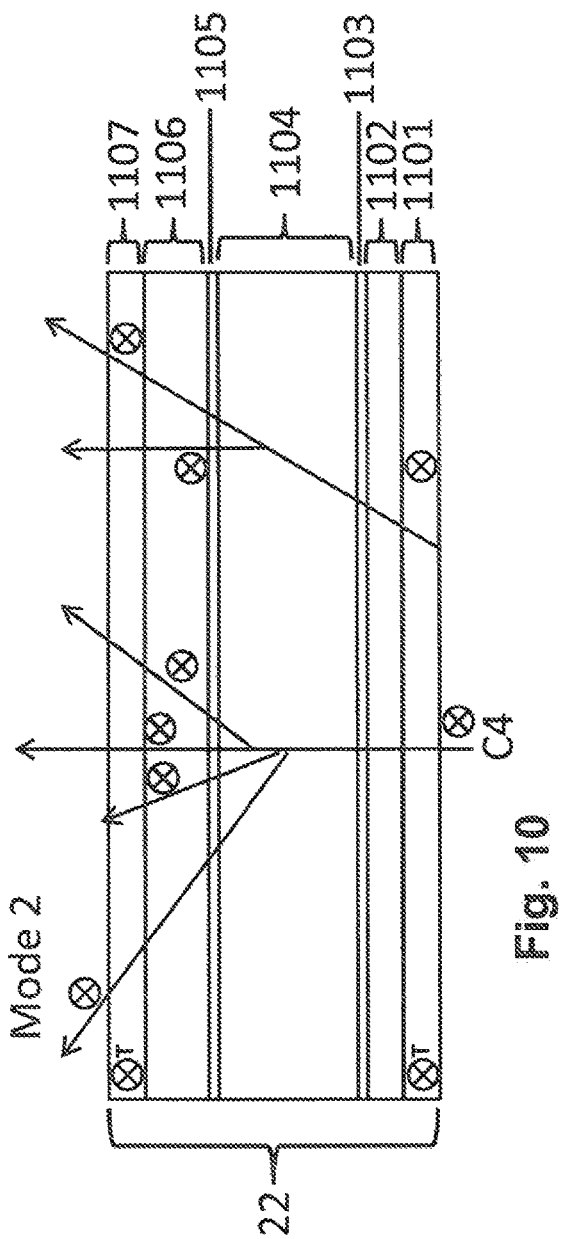

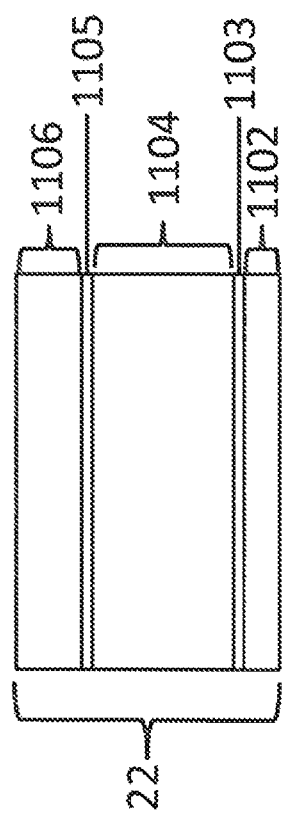

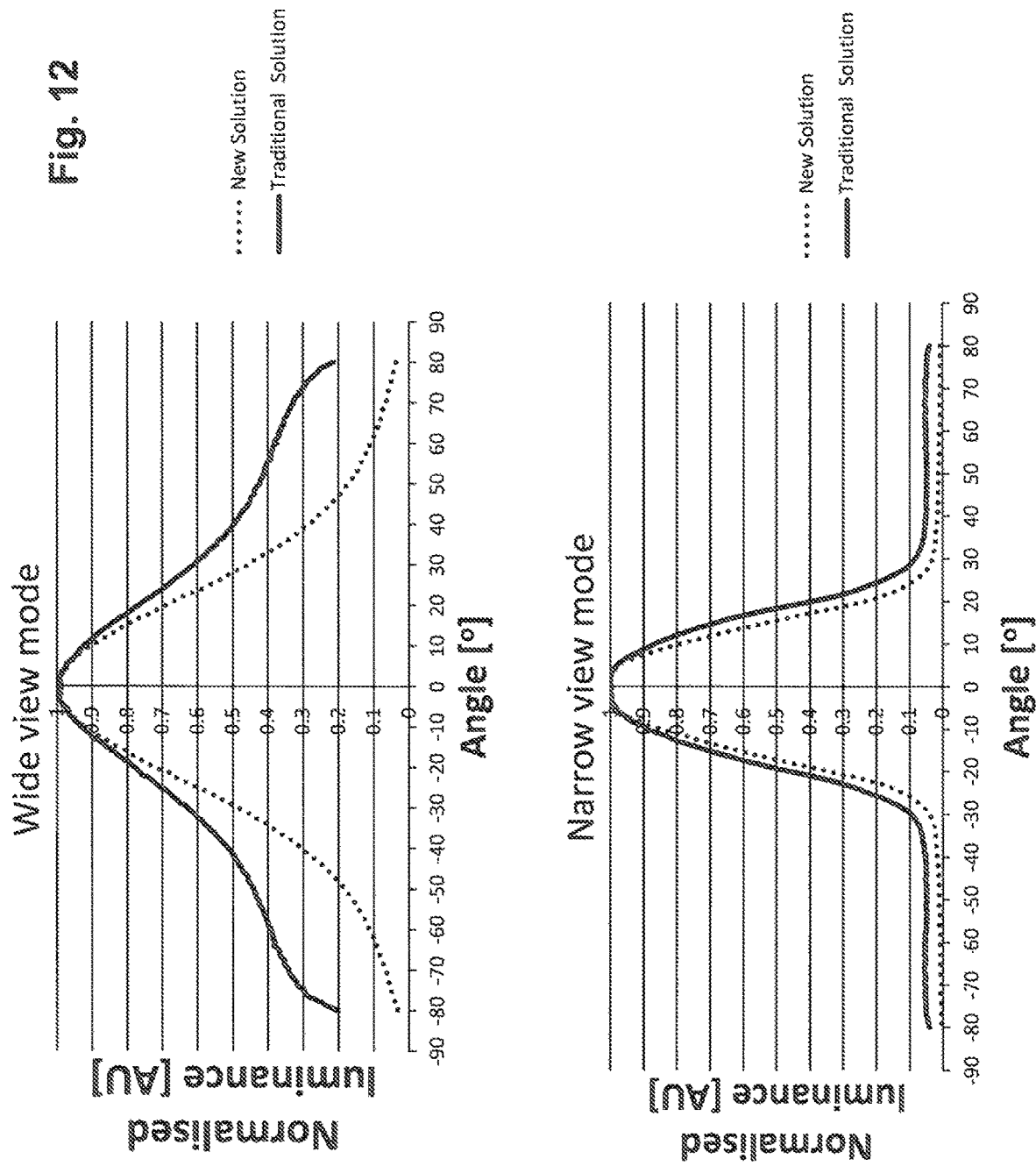

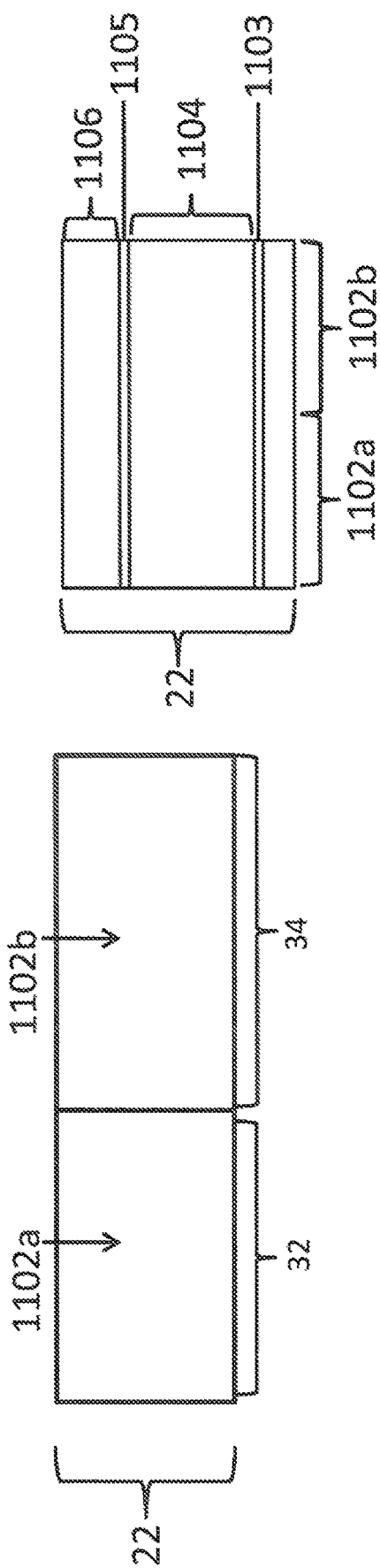
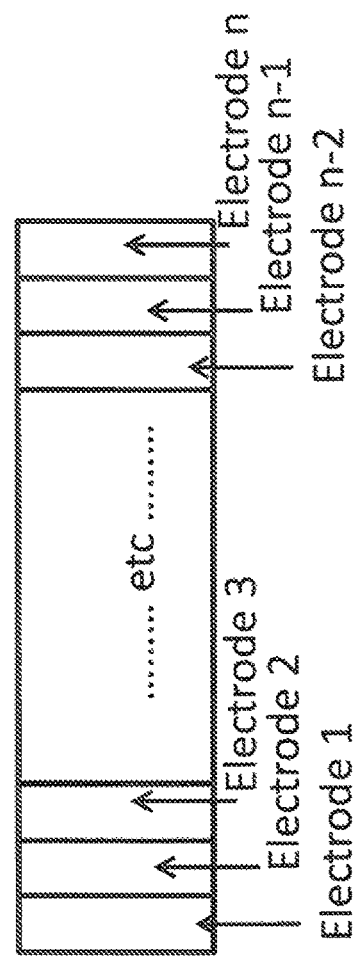
Fig. 17
Fig. 18

LIQUID CRYSTAL PRIVATE DEVICE

TECHNICAL FIELD

The present invention relates to liquid crystal display devices, and more specifically to liquid crystal display devices that are switchable between a narrow angle view mode (also referred to as a private mode) and a wide angle view mode (also referred to as a public mode).

BACKGROUND ART

With the increased use of portable computing devices having liquid crystal displays (LCDs), such as smartphones, laptop computers, tablet computers and the like, users have become concerned with other individuals being able to read sensitive or private information. Accordingly, many portable computing devices are operable in a narrow angle view mode (also referred to as a private mode) in which information is largely viewable only by an on-axis viewer, and a wide angle view mode (also referred to as a public mode) in which information is generally viewable at wider viewing angles by off-axis viewers within the capabilities of the device. Such devices typically are switchable between the narrow angle view mode and the wide angle view mode. Electronic switching methods in particular have been developed to avoid the need for moving parts, which may be unsuitable within the size constraints of portable computing devices.

One method of switching between the public and private modes with no moving parts is to mount a light control film behind the image display panel relative to the viewing side of the device, and to place a diffuser that can be electronically switched on and off between the light control film and the image display panel. Switchable private devices of this type are described, for example, in U.S. Pat. No. 5,831,698 (Depp et al., issued Nov. 3, 1998), U.S. Pat. No. 6,211,930 (Sautter et al., issued Apr. 3, 2001), and U.S. Pat. No. 5,877,829 (Okamoto et al., issued Mar. 2, 1999).

As another example of this type of device, US 2017/0069236 (Klippstein et al., published Mar. 9, 2017) illustrates a system that can be switched between a wide angle view mode and a narrow angle view mode using a combination of three layers: (1) a standard backlight, (2) a permanent view angle control film, and (3) a second backlight, which then illuminate an image display panel. The first two layers provide for a narrow angle view by operation of the view angle control film. The third layer permits switching to a wide angle view. In particular, the second backlight is mostly transparent to on-axis light, but when in use emits light strongly at large off-axis angles. This solution is deficient in that even the weak scattering of on-axis light is sufficient to decrease the view angle control of the device. US 2017/0153383 (Lee et al., published Jun. 1, 2017) discloses another device that can be switched between a wide angle view mode and a narrow angle view mode by use of a second backlight unit. Such configuration employs non-scattering optics.

The above configurations further are deficient in requiring secondary backlights, which increases thickness and adds cost. Furthermore, because there is no additional screening, the view angle control of such devices is insufficient for some applications such as automotive displays.

U.S. Pat. No. 9,720,266 (Su et al., issued Aug. 1, 2017) describes another method for achieving variable view angle control by use of a second common electrode. This second common electrode in combination with a high pretilt alignment layer allows for control of the out-of-plain reorientation of the liquid crystal, and consequently the viewing angle. This device has deficiencies because the view angle control is caused by out-of-plane reorientation of the liquid crystal caused by a secondary common electrode. First, the view angle control is insufficient for some applications, and second, the increased pretilt required by such configurations reduces the performance of the LCD as an image panel.

SUMMARY OF INVENTION

This present disclosure describes a display system that is electrically switchable between a narrow angle view mode (also referred to as a private mode) and a wide angle view mode (also referred to as a public mode). With the described configurations, a display device operates in different states that enable both enhanced screening off-axis light and scattering of light. The described configurations can be used both to augment traditional collimated backlight systems by adding additional off-axis light control, and to add functionality by scattering light enabling a wide angle view mode.

Current approaches to achieving strong off-axis light control, such as described above, do so at the cost of resolution and/or brightness. Furthermore, conventional configurations require the inclusion of an additional optical layer, for example a switchable scattering layer or an additional light guide, to enable a wide angle view mode. The inclusion of these additional optical layers reduces off-axis light control as the layers commonly scatter light.

Embodiments of the present disclosure overcome the deficiencies of conventional configurations by the use of a novel liquid crystal (LC) switchable scattering layer, which is switchable between a transparent non-scattering state and a scattering state. The transparent non-scattering state performs additional screening of the off-axis light, amplifying the view angle control effect to provide an enhanced private mode. This is achieved by using a liquid crystal layer whereby in one state, the alignment is such that the polarization of off-axis light is rotated. When the off-axis light then reaches the next polarizer, which can be on cell, in cell, or on the image panel, the off-axis light is absorbed to enhance the private mode. The scattering state can be achieved either by the application of or removal of a bias voltage, which induces a director configuration within the liquid crystal where there are discontinuities in the refractive index encountered by a light ray. The scattering mode provides for a wide-view angle public mode.

An aspect of the invention, therefore, is a switchable view angle control device that provides an enhanced private mode while maintaining a high quality public mode as compared to conventional configurations. In exemplary embodiments, the switchable view angle control device includes an electrically switchable view angle control liquid crystal device (LCD) that is operable in a first state and a second state; a front polarizer located on a viewing side of the switchable view angle control LCD; and a polarized light source located on a non-viewing side of the switchable view angle control LCD that emits polarized light. When the switchable view angle control LCD in the first state, the view angle control device operates in a narrow angle view mode in which off-axis polarized light from the polarized light source is changed by the switchable view angle control LCD so that the off-axis light is absorbed by the front polarizer, and on-axis light passes through the switchable view angle control LCD and the front polarizer. When the switchable view angle control LCD is in the second state, the view angle control device operates in a wide angle view mode in which the polarized light from the polarized light source is scattered by the switchable view angle control LCD and passes through the front polarizer.

Another aspect of the invention is a display system that includes an enhanced switchable view angle control device. In exemplary embodiments, the display system includes an electrically switchable view angle control liquid crystal device (LCD) that is operable in a first state and a second state; an image panel; and a view angle control film located on a non-viewing side of the switchable view angle control LCD. When the switchable view angle control LCD is in the first state, the display system operates in a narrow angle view mode in which off-axis light is blocked and on-axis light passes through the switchable view angle control LCD to be emitted by the display system. When the switchable view angle control LCD in the second state, the display device operates in a wide angle view mode in which the switchable view angle control LCD scatters light to be emitted by the display system. The image panel may be a liquid crystal image panel, and the display system further includes a backlight located on a non-viewing side of the display system relative to the liquid crystal image panel. Alternatively, the image panel may be an emissive image panel located on a non-viewing side of the view angle control film.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 1 is a schematic drawing depicting a non-switchable privacy liquid crystal display (LCD) configuration as is conventional in the art.

FIG. 2 is a schematic drawing depicting an exemplary LCD device configuration in accordance with embodiments of the present invention.

FIG. 5 is a schematic drawing depicting an exemplary display device configuration using an emissive image panel in accordance with embodiments of the present invention.

FIG. 6 is a schematic drawing depicting an exemplary display device configuration using an LCD image panel and an emissive color filter in accordance with embodiments of the present invention.

FIG. 7 is a schematic drawing depicting an exemplary display device configuration using a view angle controlling backlight in accordance with embodiments of the present invention.

FIG. 9 is a schematic drawing depicting an exemplary view angle control LCD in accordance with embodiments of the present invention, including optical performance in a narrow view angle mode.

FIG. 10 is a schematic drawing depicting the exemplary view angle control LCD of FIG. 9 and showing optical performance in a wide view angle mode.

FIG. 11 is a schematic drawing depicting another exemplary view angle control LCD in accordance with embodiments of the present invention, in which polarizers are not incorporated into the view angle control LCD.

FIG. 12 includes graphs depicting a comparison of performance of a conventional display device configuration versus performance of a display device configuration in accordance with embodiments of the present invention.

FIG. 17 is a drawing depicting an exemplary electrode configuration pertaining to the switchable view angle control LCD, the electrode configuration being patterned to enable the half view function depicted in FIG. 16.

FIG. 18 is a drawing depicting how the electrode patterning of FIG. 17 may be expanded to any number of "n" electrodes.

DESCRIPTION OF EMBODIMENTS

Figure 4:
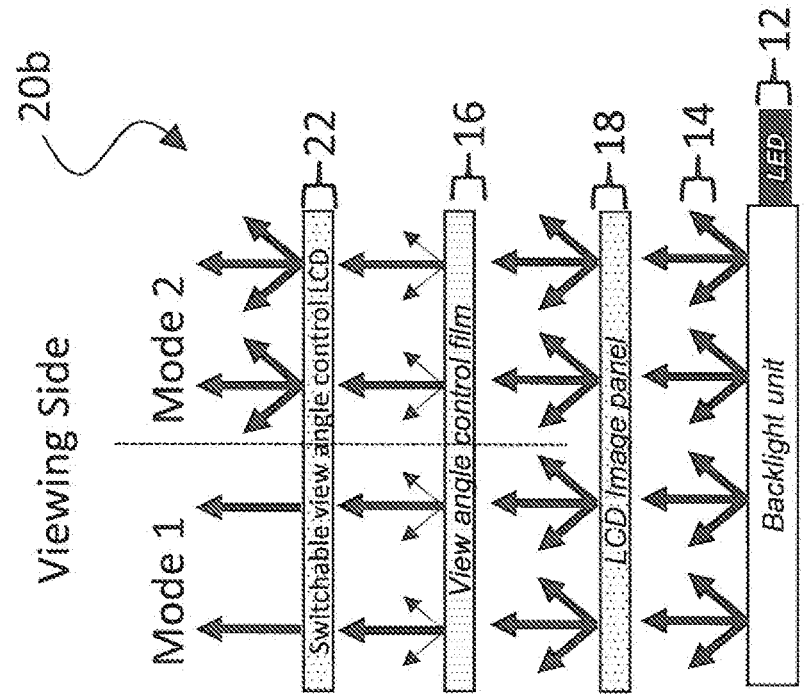
FIG. 4 is a schematic drawing depicting an LCD device configuration having comparable components as in FIG. 2, with another alternative arrangement of the components.

Embodiments of the present invention will now be described with reference to the drawings, wherein like reference numerals are used to refer to like elements throughout. It will be understood that the figures are not necessarily to scale.

FIG. 1 is a schematic drawing depicting a liquid crystal device (LCD) configuration 10 as is conventional in the art. FIG. 2 is a schematic drawing depicting an LCD configuration 20 in accordance with embodiments of the present invention. In the conventional configuration 10, a backlight 12 emits light 14 to a view angle control film 16, and the light subsequently illuminates a liquid crystal display (LCD) image panel 18. The view angle control film may be a louver film as are known in the art. As illustrated by the arrows schematically illustrating the light beams 14, although there is some attenuation of off-axis light by the view angle control film 16, the screening of the off-axis light often is insufficient to provide a full private mode, as some residual off-axis light is still transmitted to the image panel 18 and thus to the viewing side (as indicated by the smaller arrows pointing in the off-axis direction). Accordingly, a strong private mode is not achieved as an image corresponding to the residual off-axis light still may be perceived by an off-axis viewer.

An aspect of the invention, therefore, is a display system that includes an enhanced switchable view angle control device to provide a strong private mode while maintaining a high-quality public mode. In exemplary embodiments, the display system includes an electrically switchable view angle control liquid crystal device (LCD) that is operable in a first state and a second state; an image panel; and a view angle control film located on a non-viewing side of the switchable view angle control LCD. When the switchable view angle control LCD is in the first state, the display system operates in a narrow angle view mode in which off-axis light is blocked and on-axis light passes through the switchable view angle control LCD to be emitted by the display system. When the switchable view angle control LCD in the second state, the display device operates in a wide angle view mode in which the switchable view angle control LCD scatters light to be emitted by the display system. The image panel may be a liquid crystal image panel, and the display system further includes a backlight located on a non-viewing side of the display system relative to the liquid crystal image panel. Alternatively, the image panel may be an emissive image panel located on a non-viewing side of the view angle control film.

Referring to the figures, in the LCD device 20 of FIG. 2 in accordance with embodiments of the present invention, an additional switchable view angle control LCD 22 is incorporated into the device. The conventional view angle control film 16 restricts light for a range of off-axis angles. The switchable view angle control LCD 22 may be a switchable scattering LCD that can be electrically switched between a first mode (Mode 1 in FIG. 2) and a second mode (Mode 2 in FIG. 2). In the first mode (Mode 1), the switchable view angle control LCD 22 performs a view angle restriction function without scattering light to provide a narrow angle viewing or private mode. Comparing Mode 1 to the conventional configuration, the off-axis light that might not be screened out by the view angle control film 16 is now blocked by the switchable view angle control LCD 22. In this manner, an enhanced private mode is achieved as compared to conventional configurations. In the second mode (Mode 2), the switchable view angle control LCD 22 operates to perform a light scattering function to achieve a wide angle viewing or public mode.

The first mode of the switchable view angle control LCD 22 may be achieved via the application of a voltage across the LC material, while the second mode may be achieved with no voltage applied across the LC material. Conversely, the second mode of the switchable view angle control LCD may be achieved via the application of a voltage across the LC material, while the first mode may be achieved with no voltage applied across the LC material.

The LCD image panel 18 may be any conventional LCD image panel containing pixels and that is capable of displaying pictures and text in a conventional fashion. The backlight unit 12 may be a conventional backlight unit, a collimated backlight unit, a switchable backlight unit that is switchable between wide view and collimated light emission, or a conventional backlight unit in addition to a view angle control film. In addition, the backlight unit 12 may be an active dimming type backlight. Two or more of any of the following components may be adhered together to prevent the formation of air gaps: view angle control film 16, switchable view angle control LCD 22, LCD image panel 18, and backlight unit 12.

The scattering function of the switchable view angle control LCD 22 can be achieved by several methods. For example, the liquid crystal may be doped with an ionic dopant additive so that scattering can be induced by the application or removal of a voltage to the LC layer via the device electrodes. Another method of achieving the scattering state is by using a mixture of at least two liquid crystals with opposite dielectric anisotropies, i.e. a mixture of a first LC with a $+\Delta\varepsilon$ value and a second LC with $-\Delta\varepsilon$. The aforementioned liquid crystals may themselves be composite liquid crystal mixtures. When an alternating voltage is applied to the liquid crystal cell, a hydrodynamic instability may be produced that scatters light. A further method of achieving a scattering function is to use a liquid crystal with a polymer network (PNLC). A polymer network can be formed in a liquid crystal host by polymerization of an in-situ monomer mixture. This may be done by ultraviolet light exposure, which may be performed with or without an applied voltage.

In configurations in which an ionic dopant additive is incorporated into the liquid crystal material, the concentration by weight of the ionic dopant may be between 0.01% and 4%, preferably between 0.05% and 2%, and more preferably between 0.1% and 1.5%. Furthermore, the liquid crystal may have a positive $\Delta\varepsilon$ or may have a negative $\Delta\varepsilon$. The ionic dopant is such that its addition to the liquid crystal enables the switching of the mixture between a scattering and a non-scattering state via application or removal of a voltage. The chemical structure of the ionic dopant may be a salt, or a salt in which the cation and/or anion may have a number of organic chains attached which may be either an alkyl or an aryl or a mixture. For example, the ionic dopant may be Tetradecyltrimethylammonium bromide (TDTAB), and/or Tetrabutylammonium bromide (TBAB), and/or Hexadecyltrimethylammonium bromide CTAB, and/or Tetraoctylammonium bromide (TOAB), and/or Benzenediazonium chloride and/or a salt containing both Tetraphenylboronium and tetrabutylammonium.

In configurations in which the scattering function is achieved by doping the liquid crystal with an ionic dopant, the view angle control function may be achieved by applying 0 V across the liquid crystal cell. The scattering function for the wide angle view mode may be achieved by applying a voltage across the liquid cell, and the voltage may be an AC voltage. The voltage magnitude and frequency applied to the liquid crystal/ionic dopant mixture in the switchable view angle control LCD 22 may be dependent on the specific chemical structure of the ionic dopant. In general, the applied voltage may be between 1 V and 50 V, and the applied frequency may be between 0.1 Hz and 1 kHz. In general, a lower voltage is preferable to reduce power consumption, and a lower frequency is preferable to reduce power consumption. However, the optimum voltage and frequency in terms of low power consumption may not be the same as the optimum voltage and frequency in terms of the desired scattering function. Therefore, an appropriate voltage and frequency may be selected as a trade-off between acceptable power consumption and acceptable scattering function. In the specific case of TBAB, for example, this voltage may be between 2 V and 50 V, preferably between 10V and 30 V, and more preferably between 16V and 26V to balance the power consumption and scattering function. The voltage may be applied at a frequency that is between 2 Hz and 200 Hz, preferably between 20 Hz and 100 Hz, and more preferably between 30 Hz and 60 Hz to balance the power consumption and scattering function.

The view angle control function also can be obtained by a variety of methods. Example methods include using out-of-plane reorientation of an electrically controlled birefringence (ECB) liquid crystal cell, a hybrid aligned nematic (HAN) liquid crystal cell with planar alignment at one substrate and vertical alignment at the second substrate, or a vertically aligned nematic (VAN) liquid crystal cell whereby the alignment on both substrates is vertical. More particularly, the switchable view angle control LCD may include a hybrid aligned nematic (HAN) liquid crystal cell between a first substrate and a second substrate, and in the first state an alignment of the liquid crystal molecules on the first substrate is vertical and an alignment of the liquid crystal molecules on the second substrate is planar. Alternatively, the switchable view angle control LCD may include an electrically controlled birefringence (ECB) liquid crystal cell between a first substrate and a second substrate, and in the first state an alignment of the liquid crystal molecules on the first substrate is planar and an alignment of the liquid crystal molecules on the second substrate is planar. Alternatively, the switchable view angle control LCD includes a vertically aligned nematic (VAN) liquid crystal cell between a first substrate and a second substrate, and in the first state an alignment of the liquid crystal molecules on the first substrate is vertical and an alignment of the liquid crystal molecules on the second substrate is vertical.

The switchable view angle control LCD 22 may be one of the aforementioned HAN, ECB and VAN liquid crystal cells. With reference to the aforementioned HAN, ECB and VAN liquid crystal cells, the first substrate may be on the viewing side or the second substrate may be on the viewing side. With reference to the aforementioned HAN, ECB and VAN liquid crystal cells, vertical alignment means an LC pretilt orientation in the range $80°≤θ≤90°$ from the substrate surface, and planar alignment means an LC pretilt orientation in the range $0°≤θ≤10°$ from the substrate surface. The advantage of not using an LC pretilt orientation of exactly 0° and/or 90° is to prevent the formation of unwanted domains LC domains. The technique of using pretilt to prevent the formation of unwanted LC domains is well known to those skilled in the art LCD technology.

For an ECB mode liquid crystal cell, linear polarizers may be used, specifically linear polarizers that may be aligned parallel to or perpendicular to the optical axis of the ECB cell. For the ECB cell the optimum view angle control direction is perpendicular to the optical axis of the ECB cell. Further for an ECB liquid crystal cell, the retardance (dΔn) may be between 250 nm and 1250 nm, preferably between 350 nm and 1000 nm, and more preferably between 450 nm and 750 nm. The reorientation of the LC may be achieved by a voltage preferably less than 5 V.

For a HAN cell, linear polarizers are used, and specifically the linear polarizers may be aligned either parallel to or perpendicular to the planar alignment direction of the cell. For a HAN cell, the optimum view angle control direction is perpendicular to the LC alignment direction at the planar substrate. For a HAN cell in which the liquid crystal is a positive type (Δε>0), the strength of the view angle control may be increased by applying small voltages across the LC layer. The voltage may be less than 10 V, preferably less than 7.5 V, and more preferably less than 5 V. For a HAN cell, the planar alignment may be on the substrate closer to the observer, or may be on the substrate further from the observer. Further for a HAN cell, the retardance (dΔn) may be between 250 nm and 25 µm, preferably between 2500 nm and 12.5 µm, and more preferably between 5000 nm and 10 µm. The view angle control (i.e. private strength) of the hybrid alignment can be improved by application of a voltage the magnitude of which is dependent on the material properties of the liquid crystals.

For a configuration using a vertically aligned liquid crystal cell, either linear or circular polarizers can be used. In the case of using linear polarizers, the strongest off-axis privacy control is achieved at 45° to the optical axis of the polarizers. In the case of using circular polarizers the off-axis privacy control is similar for all azimuth angles. Further for a vertically aligned liquid crystal cell, the retardance (dΔn) may be between 500 nm and 5000 nm, preferably between 750 nm and 3250 nm, and more preferably between 1000 nm and 2250 nm.

In the context of the layering of the components of device configurations described herein, the viewing side, sometimes also referred to as the outer side of the LCD, is the side at which a person typically would look at or view images on the LCD, from which images may be provided for projection, and so on. Relative to the illustrations in the drawings, the top or upper side of the LCD configuration, or of a component or layer of the LCD, is at the top of the respective drawings, i.e., is closer to the viewing side. The side opposite to the viewing side is referred to as the non-viewing side, bottom, lower, or back side, or in some cases the backlight-side of the LCD.

In the context of the layering of components in accordance with embodiments of the present invention, the switchable view angle control LCD 22 should be on the viewing side of the LCD device relative to the view angle control film 16, so that any residual off-axis light not attenuated by the view angle control film is blocked by the switchable view angle control LCD 22. The farthest layer from the viewing side should be the backlight unit 12 as the light source. Within such configuration, the location of the LCD image panel may be placed at any suitable location.

Figure 3:
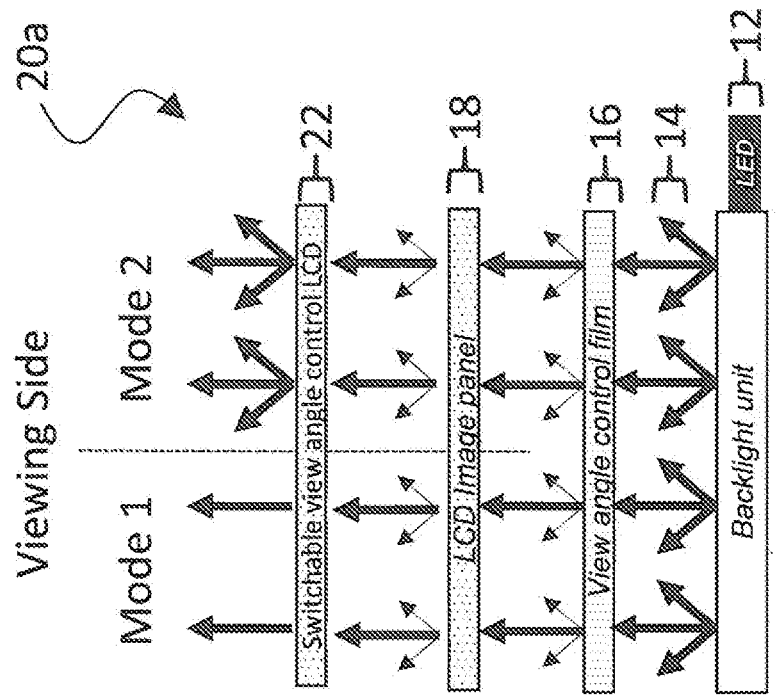
FIG. 3 is a schematic drawing depicting an LCD device configuration having comparable components as in FIG. 2, with an alternative arrangement of the components.

FIGS. 3 and 4, therefore, are schematic drawings respectively depicting LCD device configurations 20a and 20b having comparable components as in FIG. 2, with an alternative arrangement or ordering of the components. Both Modes 1 (narrow angle view mode) and 2 (wide angle view mode) also are shown in these figures. In the embodiment of FIG. 3, the components are ordered from the viewing side: switchable view angle control LCD 22, LCD image panel 18, view angle control film 16, and backlight unit 12. In the embodiment of FIG. 4 the components are ordered from the viewing side: switchable view angle control LCD 22, view angle control film 16, LCD image panel 18, and backlight unit 12. As referenced above, in these variations the switchable view angle control LCD 22 is on the viewing side of the LCD device relative to the view angle control film 16. This ensures that in the narrow view angle mode (Mode 1), the switchable view angle control LCD 22 blocks any residual off-axis light that is passed through the view angle control film 16.

In the previous embodiments, an LCD image panel is employed. In alternative embodiments, different display technologies may be employed, including for example the use of emissive image panels or image panels combined with an emissive color filter. For example, FIG. 5 is a schematic drawing depicting an exemplary display device configuration 20c using an emissive image panel 24. The emissive image panel 24, for example, may be, but is not limited to, a quantum dot light-emitting diode (QLED), micro light-emitting diode (µLED), or organic light-emitting diode (OLED) image panel. In the embodiment of FIG. 5 the components ordered from the viewing side are: switchable view angle control LCD 22, view angle control film 16, and emissive image panel 24. With the use of an emissive image panel, a backlight component is not required, and the emissive image panel is on the non-viewing side of the layered components.

As another example, FIG. 6 is a schematic drawing depicting an exemplary display device configuration 20d using an LCD image panel with an emissive color filter. With this configuration, colors are achieved by the use of an emissive color filter 26, such as for example a QLED color filter. In the embodiment of FIG. 6 the components ordered from the viewing side are: switchable view angle control LCD 22, view angle control film 16, emissive color filter 26, LCD image panel 18, and backlight unit 12. This specific arrangement, whereby the emissive color filter layer 26 is located on the non-viewing side relative to the view angle control film 20, is significant when the nature of the emissive color filter 26 is to change the angular dependence of the input light. Other orderings of these components may be employed when the emissive color filter 26 does not change the angular dependence of the input light. In addition, instead of using a backlight unit and an LCD image panel, and emissive image panel may be employed comparably as in the embodiment of FIG. 5.

FIG. 7 is a schematic drawing depicting an exemplary display device configuration 20e using a view angle controlling (i.e. collimated or narrow view angle) backlight 28 in accordance with embodiments of the present invention. With such configuration, a separate permanent view angle control film 16 may be omitted, as comparable view angle control is performed by the alternative backlight unit 28. In addition, the positions of the LCD image panel 18 and the switchable view angle control LCD 22 may be reversed (such as in the configuration of FIG. 2). In addition, the LCD image panel and backlight unit can be replaced by a view angle controlling (i.e. collimated or narrow view angle) emissive type image panel as in the embodiment of FIG. 5, or an emissive color filter could be used in combination with the LCD image panel and backlight unit as in the embodiment FIG. 6, so long as the emission of the emissive type image panel is sufficiently collimated.

FIGS. 8A-8D are drawings depicting alternative arrangements of optical layers within a display system in accordance with embodiments of the present invention. In particular, specific polarizers, spacers, and like additional optical components are illustrated as positioned relative to the components described above with reference to FIGS. 2-7. Accordingly, like components are identified with like reference numerals in FIGS. 8A-8D as in FIGS. 2-7.

Figures 8A, 8B, 8C:
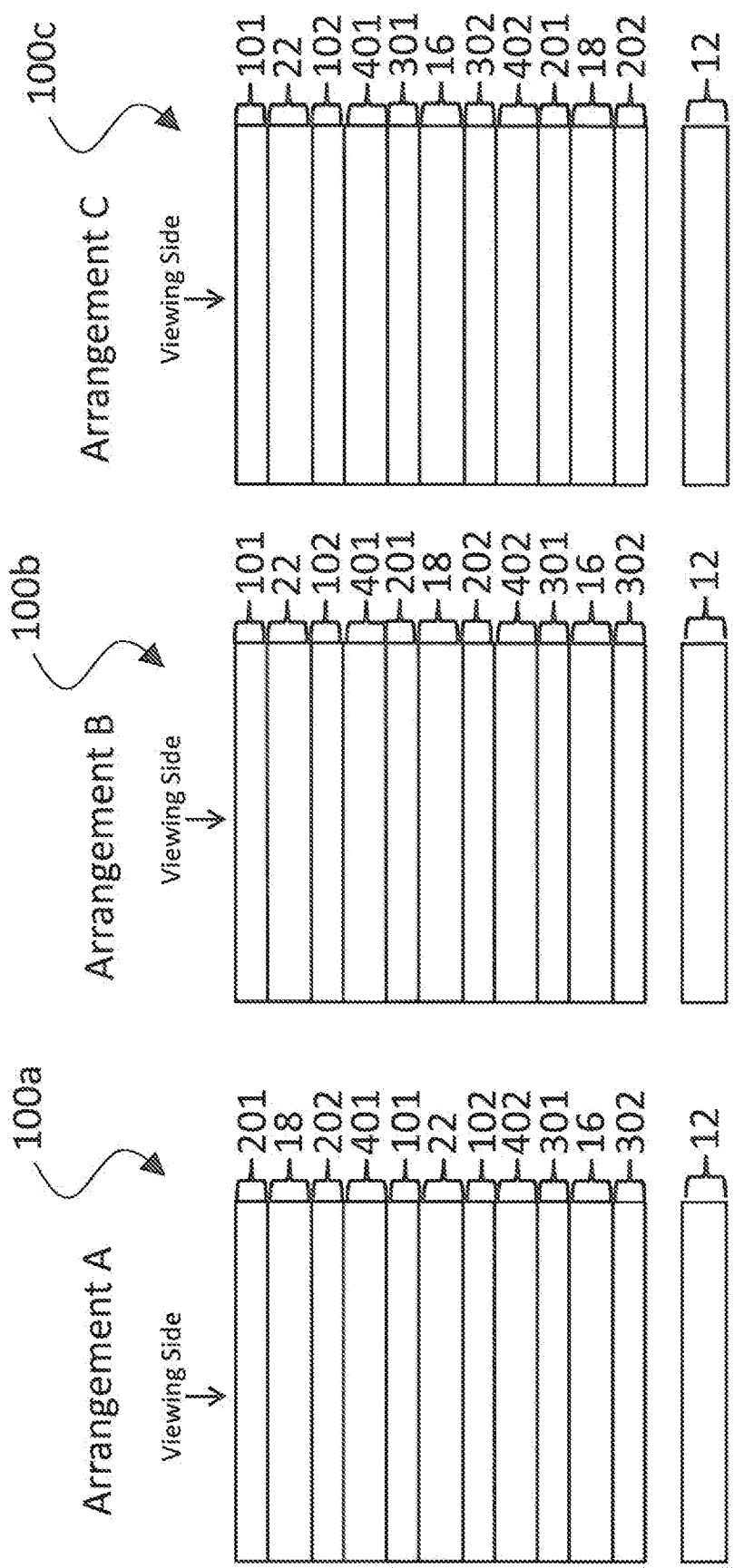
FIGS. 8A, 8B, 8C, and 8D are drawings depicting alternative arrangements of optical layers within a display system in accordance with embodiments of the present invention.

In the embodiment of FIG. 8A (Arrangement A), a display system 100a includes the components described above positioned comparably as in FIG. 2. With additional optical layers, the display system 100a includes the component layers ordered from the viewing side as follows: a front polarizer 201 for the LCD image panel 18, the LCD image panel 18, a rear polarizer 202 for the LCD image panel 18, a first spacer layer 401, a front polarizer 101 for the switchable view angle control LCD 22, the switchable view angle control LCD 22, a rear polarizer 102 for the switchable view angle control LCD 22, a second spacer layer 402, a front polarizer 301 for the view angle control film 16, the view angle control film 16, a rear polarizer 302 for the view angle control film 16, and the backlight unit 12. The rear polarizer 302 for the view angle control film may be replaced with or used in combination with a reflective type polarizer (DBEF). If present, the DBEF will be placed closest to the backlight (i.e. non-viewing side). The spacer layers 401 and 402 may be an air gap, an adhesive layer, or a retardation layer. Any or all of the polarizers 101, 102, or 301 may be omitted due to redundancy. The polarizers 201 and 202 may be intrinsic to the image panel LCD 18. The first (front) polarizer of the display system 100a that is on the viewing side of the switchable view angle control LCD 22 may be polarizer 101 or polarizer 202. Said first (front) polarizer may be a combination of a polarizer and a reflective type polarizer (DBEF). If present, the DBEF is situated on the non-viewing side of said first (front) polarizer.

In the embodiment of FIG. 8B (Arrangement B), a display system 100b includes components positioned comparably as in FIG. 3. With additional optical layers, the display system 100b includes the component layers ordered from the viewing side as follows: a front polarizer 101 for the switchable view angle control LCD 22, the switchable view angle control LCD 22, a rear polarizer 102 for the switchable view angle control LCD 22, a first spacer layer 401, a front polarizer 201 for the image panel LCD 18, the image panel LCD 18, a rear polarizer 202 for the image panel LCD 18, a second spacer layer 402, a front polarizer 301 for the view angle control film 16, the view angle control film 16, a rear polarizer 302 for the view angle control film 16, and the backlight unit 12. Similar to the previous embodiment, the polarizer 302 may be replaced with, or used in combination with, a reflective type polarizer (DBEF). If present, the DBEF will be placed closest to the backlight (i.e. non-viewing side). The spacer layers 401 and 402 may be an air gap, and/or an adhesive layer, and/or a retardation layer. Any or all of the polarizers 102, 202 and 301 may each be omitted due to redundancy. The polarizers 201 and 202 may be intrinsic to the image panel LCD 18. The first (front) polarizer of the display system 100b that is on the viewing side of the switchable view angle control LCD 22 is polarizer 101. Said first (front) polarizer may be a combination of a polarizer and a reflective type polarizer (DBEF). If present, the DBEF is situated on the non-viewing side of said first (front) polarizer.

In the embodiment of FIG. 8C (Arrangement C), a display system 100c includes components positioned comparably as in FIG. 4. With additional optical layers, the display system 100c includes the component layers ordered from the viewing side as follows: a front polarizer 101 for the switchable view angle control LCD 22, the switchable view angle control LCD 22, a rear polarizer 102 for the switchable view angle control LCD 22, a first spacer layer 401, a front polarizer 301 for the view angle control film 16, the view angle control film 16, a rear polarizer 302 for the view angle control film 16, a second spacer layer 402, a front polarizer 201 for the image panel LCD 18, the image panel LCD 18, a rear polarizer 202 for the image panel LCD, and the backlight unit 12. Similar to the previous embodiments, the polarizer 202 may be replaced with, or used combination with, a reflective type polarizer (DBEF). If present, the DBEF will be placed closest to the backlight (i.e. non-viewing side). The spacer layers 401 and 402 may be an air gap, and/or an adhesive layer, and/or a retardation layer. Any or all of the polarizers 102, 301, and 302 may each be omitted due to redundancy. The polarizers 201 and 202 may be intrinsic to the image panel LCD 18. The first (front) polarizer of the display system 100c that is on the viewing side of the switchable view angle control LCD 22 is polarizer 101. Said first (front) polarizer may be a combination of a polarizer and a reflective type polarizer (DBEF). If present, the DBEF is situated on the non-viewing side of said first (front) polarizer.

In embodiments in which the switchable view angle control LCD 22 is an ECB or HAN mode LCD, the front and rear polarizers for the switchable view angle control LCD 22 may be linear type polarizers. In embodiments in which the switchable view angle control LCD is a VAN mode LCD, the polarizers may be linear or may be circular type polarizers. One or more retardation films may be placed between layers to compensate for optical effects or to rotate the polarization of light between any such layers. The retardation film(s) may be a half wave plate and/or a quarter wave plate and/or a positive C-plate and/or a negative C-plate.

Figure 8D:
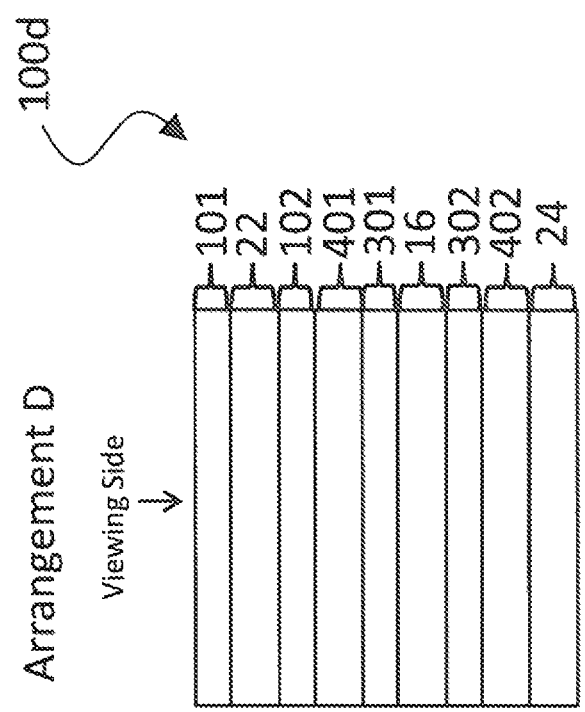

In the embodiment of FIG. 8D (Arrangement D), a display system 100d includes components positioned comparably as in FIG. 5, including an emissive image panel 24. With additional optical layers, the display system 100d includes the component layers ordered from the viewing side as follows: a front polarizer 101 for the switchable view angle control LCD 22, the switchable view angle control LCD 22, a rear polarizer 102 for the switchable view angle control LCD 22, a first spacer layer 401, a front polarizer 301 for the view angle control film 16, the view angle control film 16, a rear polarizer 302 for the view angle control film 16, a second spacer layer 402, and an emissive image panel 24. As referenced above, the emissive image panel 24 may be a μLED, OLED, or QLED image panel, and the use of an emissive image panel obviates the need for a backlight component. Similar to previous embodiments, the emissive image panel 24 may contain a polarizer and/or a retarder layer, and the polarizer may be or incorporate a reflective type polarizer (DBEF). The spacer layers 401 and 402 may be an air gap, and/or an adhesive layer, and/or a retardation layer. Any or all of the polarizers 102, 301, and 302 may each be omitted due to redundancy. The first (front) polarizer of the display system 100d that is on the viewing side of the switchable view angle control LCD 22 is polarizer 101. Said first (front) polarizer may be a combination of a polarizer and a reflective type polarizer (DBEF). If present, the DBEF is situated on the non-viewing side of said first (front) polarizer.

Also as in previous embodiments, with alternative use of an emissive image panel, in embodiments in which the switchable view angle control LCD 22 is an ECB or HAN mode LCD, the front and rear polarizers for the switchable view angle control LCD 22 may be linear type polarizers. In embodiments in which the switchable view angle control LCD is a VAN mode LCD, the polarizers may be linear or may be circular type polarizers. One or more retardation films may be placed between layers to compensate for optical effects or to rotate the polarization of light between such layers. The retardation film(s) may be a half wave plate and/or a quarter wave plate and/or a positive C-plate and/or a negative C-plate.

The following describes the optical performance of the switchable view angle control LCD 22, both in narrow and wide angle viewing modes. In exemplary embodiments, the switchable view angle control device includes an electrically switchable view angle control liquid crystal device (LCD) 22 that is operable in a first state and a second state; a front polarizer located on a viewing side of the switchable view angle control LCD; and a polarized light source located on a non-viewing side of the switchable view angle control LCD that emits polarized light. When the switchable view angle control LCD in the first state, the view angle control device operates in a narrow angle view mode in which off-axis polarized light from the polarized light source is changed by the switchable view angle control LCD so that the off-axis light is absorbed by the front polarizer, and on-axis light passes through the switchable view angle control LCD and the front polarizer. When the switchable view angle control LCD in the second state, the view angle control device operates in a wide angle view mode in which the polarized light from the polarized light source is scattered by the switchable view angle control LCD and passes through the front polarizer.

Referring to the figures, FIG. 9 is a schematic drawing depicting an exemplary view angle control LCD 22 and showing optical performance in a narrow view angle mode (Mode 1). FIG. 10 is a schematic drawing depicting the exemplary view angle control LCD 22 of FIG. 9 and showing optical performance in a wide view angle mode (Mode 2). In general, the switchable view angle control LCD 22 may include the following components ordered from the viewing side as follows: a front polarizer 1107, a first electrode substrate 1106, a first LC alignment layer 1105, a switchable liquid crystal LC layer 1104, a second alignment layer 1103, a second electrode substrate 1102, and a rear polarizer 1101. In this example, the transmission axis of the polarizers (denoted "T") are of a first direction (e.g., into the page in the example drawing).

Referring to FIG. 9 and Mode 1 (narrow angle view), exemplary polarized light beams C1 and C2 are emitted from the non-viewing side components comprising the polarized light source (e.g., backlight or emissive image panel, and any associated polarizers to generate the polarized light as in FIGS. 8A-8D). The light beam C1 and C2 are polarized in the first direction, and light beam C3 is polarized in a second direction different from the first direction. Light beams C1 and C3 are on-axis beams, and light beam C2 is an off-axis beam. In Mode 1, the switchable LC layer 1104 is in a first state that passes light without scattering, i.e., a non-scattering state. With the indicated polarizations, light polarized in the second direction (C3) is undesirably polarized light and thus is blocked (or reflected if a reflective polarizer is present) by the rear polarizer 1101. The light beams C1 and C2 polarized in the first direction are transmitted through the rear polarizer 1101. In Mode 1, the polarization of the off-axis light is rotated by the liquid crystal structure of the LC layer 1104, and thus the off-axis light subsequently is absorbed by the front polarizer 1107. The rotation of polarization of the off-axis light can be achieved by several methods, including for example using planar aligned liquid crystal with bias voltage applied; a vertical aligned liquid crystal, and a hybrid aligned liquid crystal in which the alignment at one substrate is planar while the alignment of the other substrate is vertical. In contrast, the on-axis light C2 of the first polarization direction is transmitted through the switchable view angle control LCD 22 and is emitted from the viewing side, ultimately to be emitted from the broader display device substantially only in an on-axis direction. In this manner, the narrow angle view mode is achieved in that essentially only the on-axis light is emitted.

In Mode 2, the switchable LC layer 1104 is in a second state that scatters light, i.e., a scattering state. In particular, all light of the first polarization direction C4 is scattered. This can be achieved by multiple methods, including for example using a polymer dispersed liquid crystal, a multi-component liquid crystal containing a mixture of negative and positive dielectric anisotropy liquid crystals, or using a liquid crystal doped with ionic contaminants. In these examples, when a sufficient voltage is applied the LC layer 1104 scatters light by inducing a chaotic liquid crystal director alignment. In addition, this chaotic liquid crystal director no longer rotates off-axis polarization eliminating the off-axis light screening effect. Accordingly, both on-axis and off-axis axis light is scattered and transmitted through the switchable view angle control LCD 22, and subsequently emitted from the viewing side. The light ultimately is emitted from the display system in a scattered fashion across a wide viewing angle. In this manner, the wide angle view mode is achieved.

FIG. 11 is a schematic drawing depicting another exemplary view angle control LCD 22 in accordance with embodiments of the present invention, in which polarizers 1107 and 1101 are not incorporated specifically into the view angle control LCD 22. The remaining components are identified with like reference numerals as in the embodiments of FIGS. 9 and 10. The embodiment of FIG. 11 includes the two electrode substrates, each with a liquid crystal alignment layer. Between the substrates is a liquid crystal layer the optics of which is described above, and the polarizers are not part of view angle control LCD 22 layer. In this embodiment, therefore, the switchable view angle control LCD 22 may include the following components ordered from the viewing side as follows: a first electrode substrate 1106, a first LC alignment layer 1105, a switchable liquid crystal LC layer 1104, a second alignment layer 1103, and a second electrode substrate 1102. In contrast, the configuration of FIGS. 9 and 10 includes the supplemental polarizers 1107 and 1101 located on the substrates. Accordingly, in the embodiment of FIG. 11, the LCD image panel and view angle control films have the polarizers to perform any requisite light absorbing and transmitting functions as described above.

FIG. 12 includes demonstrative results depicting a comparison of performance of a conventional display device configuration versus performance of a display device configuration in accordance with embodiments of the present invention. Luminance is presented as a function of viewing angle for both a narrow angle view mode and a wide angle view mode. The conventional configuration is comparable to the configuration depicted in FIG. 1, with the optical system including a combination of a louver film and a PDLC scattering layer. Embodiments of the present invention may have somewhat lower luminance at wider angles in the wide angle view mode, which in practice does not correspond to any significant reduction is image quality to a viewer. The present invention, however, provides an enhanced narrow angle view mode with stronger privacy. In the narrow angle view mode, for off-axis angles greater than about 30°, an embodiment of the present invention has lower transmission, i.e. stronger privacy, than the conventional configuration. Even with the difference level depicted in the bottom graph of FIG. 12 at wider angles, an image would still tend to be visible to an off-axis viewer with the conventional configuration. In contrast, even a faint image would not be visible to an off-axis viewer using configurations of the present invention. Accordingly, the present invention outperforms the conventional configuration in a significant manner in providing enhanced privacy in the narrow angle view mode.

Figure 13:
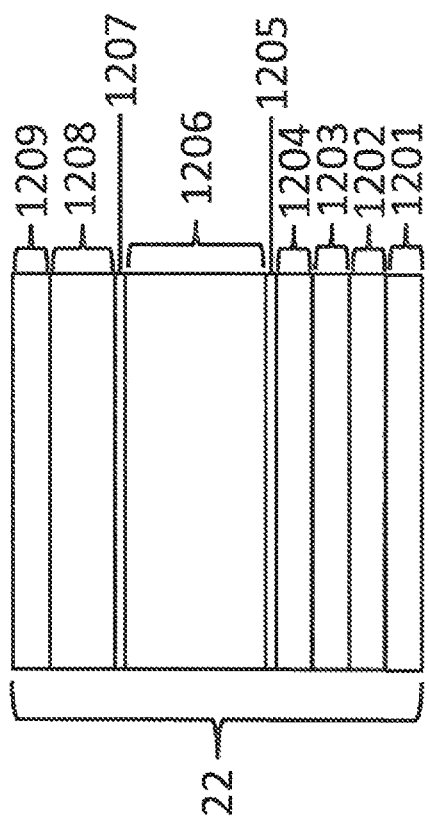
FIG. 13 is a schematic drawing depicting another exemplary view angle control LCD in accordance with embodiments of the present invention.

FIG. 13 is a schematic drawing depicting another exemplary view angle control LCD 22 in accordance with embodiments of the present invention. In this embodiment, the view angle control LCD 22 employs FFS type electrodes. This can be beneficial as some of the aforementioned methods of scattering light can be supplemented by in-plane switching. For example, an FFS type electrode may help in the case of a HAN cell that is filled with a mixture of two or more liquid crystal types with opposite dielectric anisotropies. At the vertically aligned substrate, a hydrodynamic instability is induced by the out-of-plain field due to the competing director preferences of the positive dielectric anisotropy material and negative dielectric anisotropy material. A similar effect may be induced at a planar alignment layer via FFS style electrodes. In this embodiment, the switchable view angle control LCD 22 may include the following components ordered from the viewing side as follows: a front polarizer 1209, an outer substrate 1208, a first LC alignment layer 1207, a switchable liquid crystal LC mixture layer 1206, and second alignment layer 1205, a first electrode substrate 1204, an insulator layer 1203, a second electrode substrate 1202, and a rear polarizer 1201.

Figure 14:
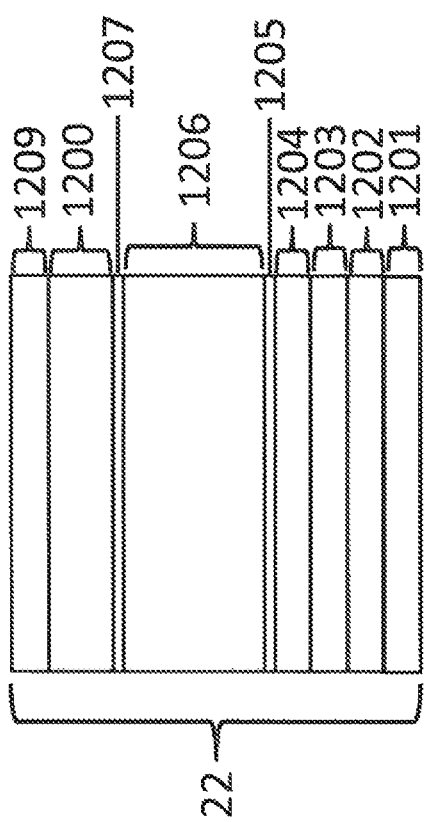
FIG. 14 is a schematic drawing depicting another exemplary view angle control LCD 22 in accordance with embodiments of the present invention.

FIG. 14 is a schematic drawing depicting another exemplary view angle control LCD 22 in accordance with embodiments of the present invention. In this embodiment, the view angle control LCD employs FFS type electrodes, with the layers being similar as in FIG. 13, as well as a third common electrode substrate 1200 on the non-FFS substrate in place of the previous substrate element 1208 of FIG. 13. This can be beneficial as some of the aforementioned methods of scattering light can be supplemented by in-plane switching. The three electrodes induce in-plane fields at the planar alignment surface, and out-of-plane fields at the vertically aligned surface. At the vertically aligned substrate, a hydrodynamic instability is induced by the out-of-plane field due to the competing director preferences of the positive dielectric anisotropy material and negative dielectric anisotropy material. A similar effect may be induced at a planar alignment layer via in-plane fields.

Figure 15:
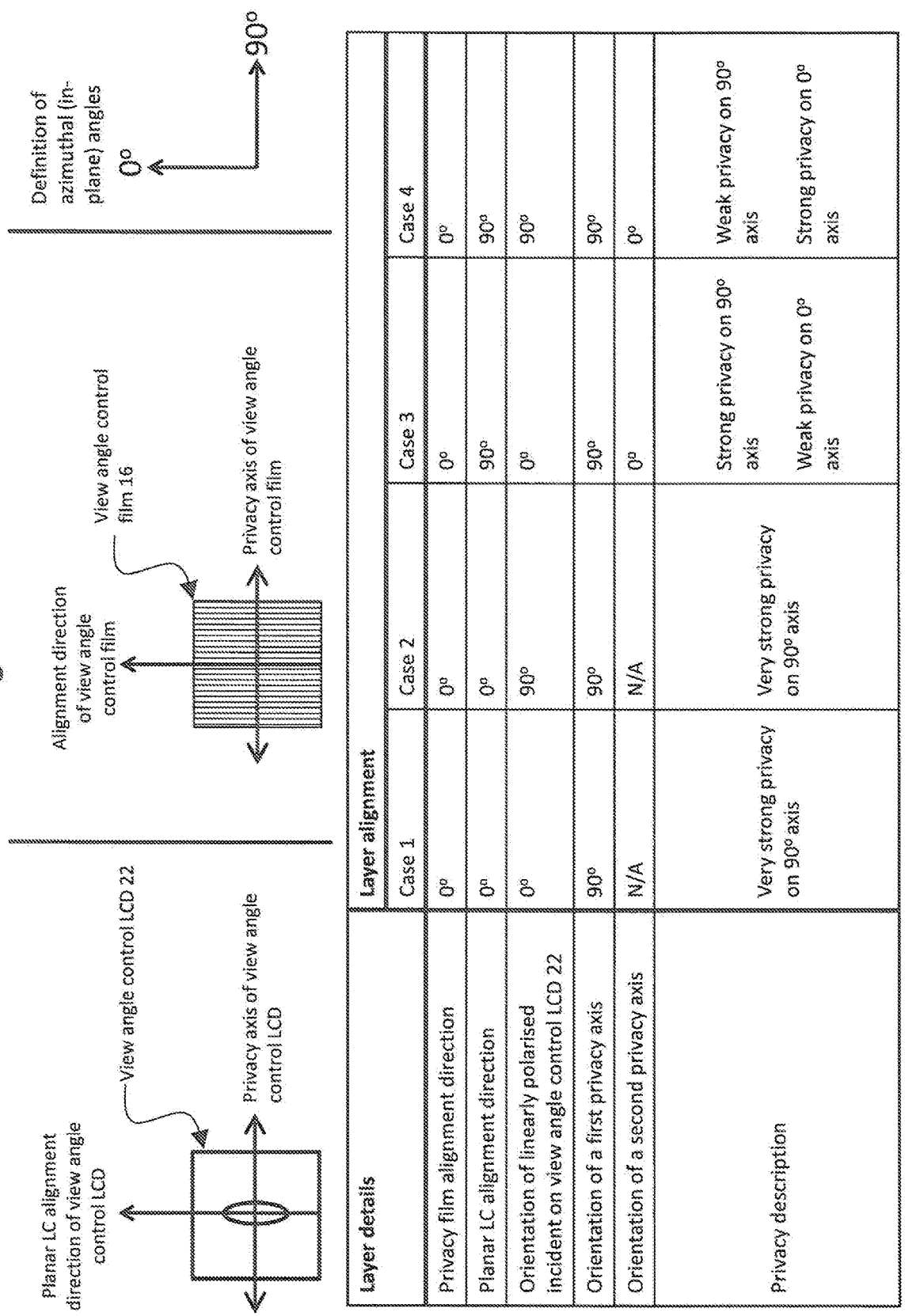
FIG. 15 is a drawing depicting optical details of the options for the relative alignment of different layers in configurations in which the view angle control function is being performed by a HAN or ECB mode liquid crystal.

FIG. 15 is a drawing depicting the relative azimuthal (in-plane) orientations of the view angle control LCD 22 (HAN and ECB), planar LC alignment direction of view angle control LCD, privacy axis of view angle control LCD, view angle control film 16, alignment direction of view angle control film, privacy axis of view angle control film, and orientation of linearly polarised incident on view angle control LCD 22. Specifically, the privacy axes of the privacy film and view angle control LCD may be substantially parallel (i.e. within 20° of parallel) or may be substantially perpendicular (i.e. within 20° of perpendicular). In the case that the axes are substantially parallel there may be one dominant privacy axis. In the case that the privacy axes are substantially perpendicular or substantially non-parallel there may be two privacy axes. In the parallel case the privacy strength along the first privacy axis may be stronger than in the non-parallel case Referring to the case designations of FIG. 15, the privacy axes of the view angle control LCD 22 and view angle control film 16 are parallel in Case 1 and perpendicular in Case 3. In Case 1 very strong privacy occurs along the first privacy axis while no privacy occurs along the second privacy axis. In Case 3, there are two privacy axes perpendicular to each other. In Case 3 each privacy strength of the first and second privacy axes are both weaker than the privacy strength along the first privacy axis in Case 1. It is assumed that the privacy strength along the privacy axis of the privacy film is greater the privacy strength along the privacy axis of the view angle control LCD; however, the opposite may be true. Another key feature can be seen by comparing Case 1 and Case 2, specifically that the privacy axis of the view angle control LCD 22 is governed by the liquid crystal alignment rather than the polarization of the incident light.

The privacy axis of the view angle control LCD and privacy axis view angle control film may be orientated parallel to each other so that there is a single axis along which very strong privacy occurs. Alternatively, the privacy axis of the view angle control LCD and the privacy axis view angle control film may be orientated perpendicular to each other so that there are two orthogonal axes along which privacy occurs. The privacy system described herein is comprised of two distinct layers which each provide independent privacy functionality. Specifically, these layers are the view angle control LCD 22 and the view angle control film 16. The privacy axes of these layers are in general independent of the other. In the above description of previous embodiments, the case is described whereby the privacy axis of the two layers are substantially parallel and consequently supplement each other resulting in a single enhanced privacy axis. In general, this does not need to be the case and the azimuthal orientation of the layers may be substantially non-parallel. When substantially non-parallel, there will be multiple privacy axes each corresponding to the privacy axis of one of the two aforementioned layers 22 and 16. Each of these privacy axes will be have weaker privacy than the privacy of the single axis in the case where the layers are effectively parallel.

Figure 16:
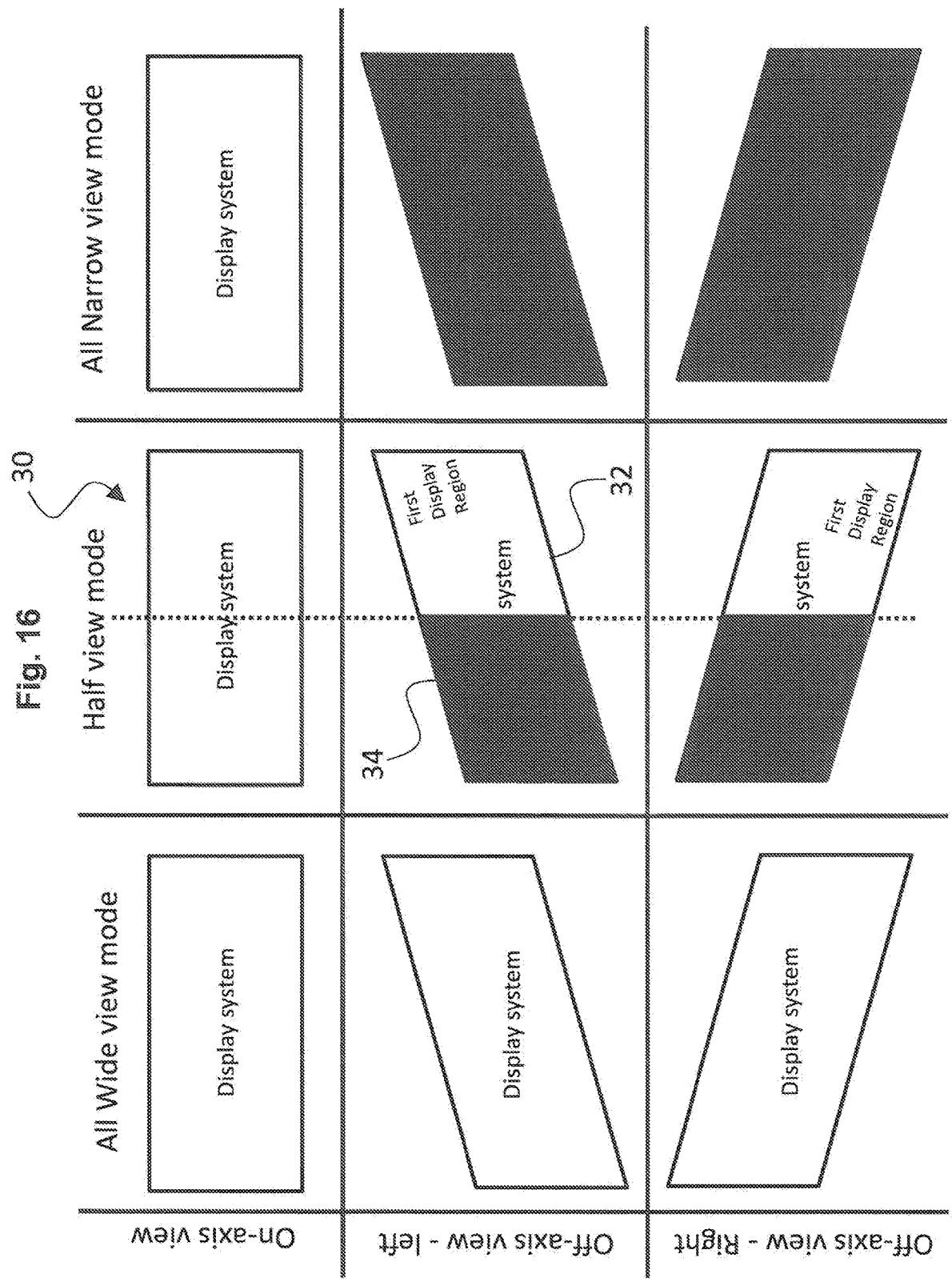
FIG. 16 is a drawing depicting a half view application of a display system configured in accordance with embodiments of the present invention.

FIG. 16 is a drawing depicting a half view application of a display system 30 configured in accordance with embodiments of the present invention. In this embodiment, the switchable view angle control LCD 22 is changed so that at least two subsections or regions of the switchable view angle control LCD 22 can be addressed separately. This enables different off-axis visibility of the subsections or regions of the display system. For example, the display system 30 may have a first display region 32 in which the switchable view angle control LCD 22 is switched to enable a wide angle view mode (public mode) and a second display region 34 that is different from the first display region 32, and in which the switchable view angle control LCD 22 is switched to enable a narrow angle view mode (private mode).

FIG. 17 is a drawing depicting an exemplary electrode configuration pertaining to the switchable view angle control LCD, the electrode configuration being patterned to enable the half view function depicted in FIG. 16. This example is illustrated with reference to a modification of the structure depicted in FIG. 11. The specific structural change is the segmentation of an electrode on at least one of the two electrode substrates, either 1102 or 1106, or both. For example, the right side portion of FIG. 17 shows segmentation of electrode 1102 into electrode portions 1102a and 1102b. Accordingly, in a simplest case the display system is segmented into two regions, shown with one of the electrodes 1102 being patterned into a first electrode portion 1102a and a second electrode portion 1102b. As shown in the left side portion of FIG. 17, electrode areas 1102a and 1102b respectively may be associated with or correspond to the first display region 32 and the second display region 34 as depicted in FIG. 16.

FIG. 18 is a drawing depicting how the electrode patterning of FIG. 17 may be expanded to any number of "n" electrodes (electrode 1, 2, 3 . . . electrode n–2, electrode n–1, electrode n), which enables the size of the first display region 32 and the second display region 34 to be adjusted. This electrode patterning may be used to enable multiple first display regions and multiple second display regions. FIG. 18 illustrates an electrode layout for "n" separate columns of electrodes to enable at least variable width areas with different off-axis properties. This could be expanded from different electrode columns to different electrode rows and further to pixel addressing within the switchable view angle control LCD 22. Generally, therefore, the switchable view angle control LCD 22 includes electrodes that are patterned so that a first region 32 of the switchable view angle control LCD is operated in the first state and a second region 34 of the switchable view angle control LCD 22 is operated in the second state. More generally, therefore, the switchable view angle control LCD 22 includes electrodes that are patterned so that at least a first region 32 of the switchable view angle control LCD is operated in the first state and at least a second region 34 of the switchable view angle control LCD 22 is operated in the second state.

Figure 19:
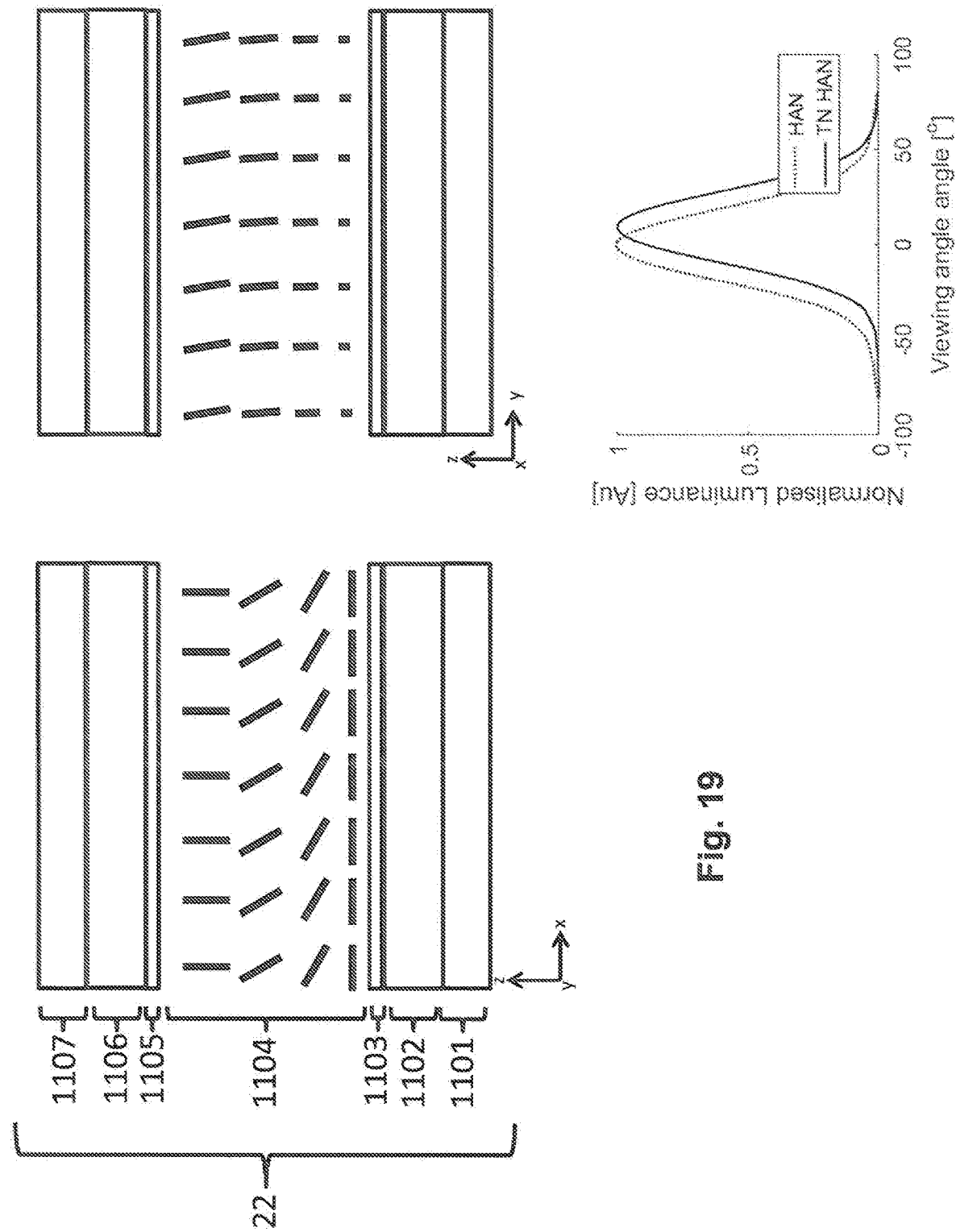
FIG. 19 is a drawing depicting an asymmetric view angle control using a TN HAN configuration in accordance with embodiments of the present invention.

As another exemplary embodiment, FIG. 19 is a drawing depicting an asymmetric view angle control using a twisted nematic (TN) HAN configuration in accordance with embodiments of the present invention, utilizing a layer structure comparably as in FIG. 9. An asymmetric view angle control functionality can be added by changing the LC alignment so that there is a pretilt on the vertically aligned substrate of the HAN configuration. In such configuration, the direction of the pretilt is not parallel to the LC director at the planar substrate. In contrast to the previous embodiments, in the asymmetric HAN (TN HAN) on-axis light observes some birefringence and undergoes polarization rotation, while off-axis light with an internal angle equal to the pretilt of the liquid crystal does not undergo polarization rotation. The effect of this is to offset the luminance profile and consequently make the privacy profile asymmetric. This can be seen in the graphical portion of FIG. 19 whereby the normal HAN has a symmetric luminance profile but the TN HAN has an asymmetric profile. The degree of the asymmetry of the view angle control is proportional to the angle of the pretilt. The LC pretilt may be in the range on the 0-20 degrees for the TN HAN, as seen in the graphical portion of FIG. 19.

An aspect of the invention, therefore, is a switchable view angle control device that provides an enhanced private mode while maintaining a high quality public mode as compared to conventional configurations. In exemplary embodiments, the switchable view angle control device includes an electrically switchable view angle control liquid crystal device (LCD) that is operable in a first state and a second state; a front polarizer located on a viewing side of the switchable view angle control LCD; and a polarized light source located on a non-viewing side of the switchable view angle control LCD that emits polarized light. When the switchable view angle control LCD in the first state, the view angle control device operates in a narrow angle view mode in which off-axis polarized light from the polarized light source is changed by the switchable view angle control LCD so that the off-axis light is absorbed by the front polarizer, and on-axis light passes through the switchable view angle control LCD and the front polarizer. When the switchable view angle control LCD is in the second state, the view angle control device operates in a wide angle view mode in which the polarized light from the polarized light source is scattered by the switchable view angle control LCD and passes through the front polarizer. The switchable view angle control device may include one or more of the following features, either individually or in combination.

In an exemplary embodiment of the switchable view angle control device, the switchable view angle control LCD includes a hybrid aligned nematic (HAN) liquid crystal cell between a first substrate and a second substrate, and in the first state an alignment of the liquid crystal molecules on the first substrate is vertical and an alignment of the liquid crystal molecules on the second substrate is planar.

In an exemplary embodiment of the switchable view angle control device, the switchable view angle control LCD includes an electrically controlled birefringence (ECB) liquid crystal cell between a first substrate and a second substrate, and in the first state an alignment of the liquid crystal molecules on the first substrate is planar and an alignment of the liquid crystal molecules on the second substrate is planar.

In an exemplary embodiment of the switchable view angle control device, the switchable view angle control LCD includes a vertically aligned nematic (VAN) liquid crystal cell between a first substrate and a second substrate, and in the first state an alignment of the liquid crystal molecules on the first substrate is vertical and an alignment of the liquid crystal molecules on the second substrate is vertical.

In an exemplary embodiment of the switchable view angle control device, the switchable view angle control LCD includes a liquid crystal mixture containing at least two liquid crystal materials with opposite sign dielectric anisotropies, and the switchable view angle control LCD is placed in the second state by applying a voltage to the liquid crystal mixture to achieve a hydrodynamic instability.

In an exemplary embodiment of the switchable view angle control device, wherein the switchable view angle control LCD includes a liquid crystal mixture containing a liquid crystal material and an additive.

In an exemplary embodiment of the switchable view angle control device, the additive is a salt.

In an exemplary embodiment of the switchable view angle control device, a cation and/or an anion of the salt is covalently bonded to an organic chemical group.

In an exemplary embodiment of the switchable view angle control device, wherein the switchable view angle control LCD includes a polymer network or a dispersion of polymer in LC or a dispersion of LC in polymer to achieve the second state.

In an exemplary embodiment of the switchable view angle control device, the device further includes a view angle control film located on a non-viewing side of the switchable view angle control LCD.

Another aspect of the invention is a display system that includes an enhanced switchable view angle control device according to any of the embodiments. In exemplary embodiments, the display system includes an electrically switchable view angle control liquid crystal device (LCD) that is operable in a first state and a second state; an image panel, and a view angle control film located on a non-viewing side of the switchable view angle control LCD. When the switchable view angle control LCD is in the first state, the display system operates in a narrow angle view mode in which off-axis is blocked and on-axis light passes through the switchable view angle control LCD to be emitted by the display system. When the switchable view angle control LCD is in the second state, the display system operates in a wide angle view mode in which the switchable view angle control LCD scatters light to be emitted by the display system. The display system may include one or more of the following features, either individually or in combination.

In an exemplary embodiment of the display system, the image panel is a liquid crystal image panel, and the display system further includes a backlight located on a non-viewing side of the display system relative to the liquid crystal image panel.

In an exemplary embodiment of the display system, an order of components from the viewing side of the display system comprises the liquid crystal image panel, the switchable view angle control LCD, the view angle control film, and the backlight.

In an exemplary embodiment of the display system, an order of components from the viewing side of the display system comprises the switchable view angle control LCD, the liquid crystal image panel, the view angle control film, and the backlight.

In an exemplary embodiment of the display system, an order of components from the viewing side of the display system comprises the switchable view angle control LCD, the view angle control film, the liquid crystal image panel, and the backlight.

In an exemplary embodiment of the display system, the display system further includes an emissive color filter, wherein an order of components from the viewing side of the display system comprises the switchable view angle control LCD, the view angle control film, the color filter, the liquid crystal image panel, and the backlight.

In an exemplary embodiment of the display system, the image panel comprises an emissive image panel located on a non-viewing side of the view angle control film.

In an exemplary embodiment of the display system, the switchable view angle control LCD includes electrodes that are patterned so that at least a first region of the switchable view angle control LCD is operated in the first state and at least a second region of the switchable view angle control LCD is operated in the second state.

In an exemplary embodiment of the display system, the switchable view angle control LCD is configured to have an asymmetric viewing window when operated in the first state.

In an exemplary embodiment of the display system, the switchable view angle control LCD includes a hybrid aligned nematic (HAN) liquid crystal cell between a first substrate and a second substrate, and in the first state an alignment layer of the liquid crystal molecules on the first substrate is a vertical alignment layer and an alignment layer of the liquid crystal molecules on the second substrate is a planar alignment layer; and the vertical alignment layer has a pretilt in a direction not parallel to the planar alignment layer.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present invention are applicable to many display devices in which a strong narrow angle view private mode is desirable in additional to a wide angle view public mode. A strong private mode in particular is desirable for portable electronic display devices that are commonly used in a public setting. Examples of such devices include mobile phones including smartphones, personal digital assistants (PDAs), and tablet and laptop computers.

REFERENCE SIGNS LIST

10—liquid crystal device (LCD) configuration
12—backlight

14—light
16—view angle control film
18—liquid crystal display (LCD) image panel
20—LCD device configuration
20a-e—variations of display device configurations
22—switchable view angle control LCD
24—emissive image panel
26—emissive color filter
28—view angle controlling backlight
30—display system
32—first display region
34—second display region
100a-d—alternative display system configurations
101—front polarizer for first component
102—rear polarizer for first component
201—front polarizer for second component
202—rear polarizer for second component
301—front polarizer for third component
302—rear polarizer for third component
401—first spacer layer
402—second spacer layer
1101—rear polarizer
1102—second electrode substrate
1102a—first electrode portion
1102b—second electrode portion
1103—second alignment layer
1104—switchable liquid crystal LC layer
1105—first LC alignment layer
1106—first electrode substrate
1107—front polarizer
1200—third common electrode substrate
1201—rear polarizer
1202—second electrode substrate
1203—insulator layer
1204—first electrode substrate
1205—second alignment layer
1206—switchable liquid crystal LC mixture layer
1207—first LC alignment layer
1208—outer substrate
1209—front polarizer

What is claimed is:

1. A switchable view angle control device comprising:
an electrically switchable view angle control liquid crystal device (LCD) that is operable in a first state and a second state;
a front polarizer located on a viewing side of the switchable view angle control LCD that transmits light polarized in a first direction and absorbs light polarized in a second direction; and
a polarized light source located on a non-viewing side of the switchable view angle control LCD that emits the light polarized in the first direction;
wherein when the switchable view angle control LCD is in the first state, the view angle control device operates in a narrow angle view mode in which the switchable view angle control LCD changes a polarization of off-axis polarized light from the polarized light source from the first direction to the second direction so that the off-axis polarized light is absorbed by the front polarizer, and on-axis light passes through the switchable view angle control LCD and the front polarizer; and
wherein when the switchable view angle control LCD is in the second state, the view angle control device operates in a wide angle view mode in which the polarized light from the polarized light source is scattered by the switchable view angle control LCD and passes through the front polarizer.

2. The switchable view angle control device of claim 1, wherein the switchable view angle control LCD includes a hybrid aligned nematic (HAN) liquid crystal cell between a first substrate and a second substrate, and in the first state an alignment of the liquid crystal molecules on the first substrate is vertical and an alignment of the liquid crystal molecules on the second substrate is planar.

3. The switchable view angle control device of claim 1, wherein the switchable view angle control LCD includes an electrically controlled birefringence (ECB) liquid crystal cell between a first substrate and a second substrate, and in the first state an alignment of the liquid crystal molecules on the first substrate is planar and an alignment of the liquid crystal molecules on the second substrate is planar.

4. The switchable view angle control device of claim 1, wherein the switchable view angle control LCD includes a vertically aligned nematic (VAN) liquid crystal cell between a first substrate and a second substrate, and in the first state an alignment of the liquid crystal molecules on the first substrate is vertical and an alignment of the liquid crystal molecules on the second substrate is vertical.

5. The switchable view angle control device of claim 1, wherein the switchable view angle control LCD includes a liquid crystal mixture containing at least two liquid crystal materials with opposite sign dielectric anisotropies, and the switchable view angle control LCD is placed in the second state by applying a voltage to the liquid crystal mixture to achieve a hydrodynamic instability.

6. The switchable view angle control device of claim 1, wherein the switchable view angle control LCD includes a liquid crystal mixture containing a liquid crystal material and an additive.

7. The switchable view angle control device of claim 6, wherein the additive is a salt.

8. The switchable view angle control device of claim 7, wherein at least one of a cation and an anion of the salt is covalently bonded to an organic chemical group.

9. The switchable view angle control device of claim 1, wherein the switchable view angle control LCD includes a polymer network or a dispersion of polymer in LC or a dispersion of LC in polymer to achieve the second state.

10. The switchable view angle control device of claim 1, further comprising a view angle control film located on a non-viewing side of the switchable view angle control LCD.

11. A display system comprising:
an electrically switchable view angle control liquid crystal device (LCD) that is operable in a first state and a second state;
an image panel, and
a view angle control film located on a non-viewing side of the switchable view angle control LCD;
wherein when the switchable view angle control LCD is in the first state, the display system operates in a narrow angle view mode in which off-axis light is blocked and on-axis light passes through the switchable view angle control LCD to be emitted by the display system, wherein the switchable view angle control LCD in the first state changes a polarization of the off-axis light from a first direction to a second direction to block the off-axis light; and
wherein when the switchable view angle control LCD is in the second state, the display system operates in a wide angle view mode in which the switchable view angle control LCD scatters light to be emitted by the display system.

12. The display system of claim 11, wherein the image panel is a liquid crystal image panel, and the display system further includes a backlight located on a non-viewing side of the display system relative to the liquid crystal image panel.

13. The display system of claim 12, wherein an order of components from the viewing side of the display system comprises the liquid crystal image panel, the switchable view angle control LCD, the view angle control film, and the backlight.

14. The display system of claim 12, wherein an order of components from the viewing side of the display system comprises the switchable view angle control LCD, the liquid crystal image panel, the view angle control film, and the backlight.

15. The display system of claim 12, wherein an order of components from the viewing side of the display system comprises the switchable view angle control LCD, the view angle control film, the liquid crystal image panel, and the backlight.

16. The display system of claim 12, further comprising an emissive color filter, wherein an order of components from the viewing side of the display system comprises the switchable view angle control LCD, the view angle control film, the color filter, the liquid crystal image panel, and the backlight.

17. The display system of claim 11, wherein the image panel comprises an emissive image panel located on a non-viewing side of the view angle control film.

18. The display system of claim 11, wherein the switchable view angle control LCD includes electrodes that are patterned so that at least a first region of the switchable view angle control LCD is operated in the first state and at least a second region of the switchable view angle control LCD is operated in the second state.

19. The display system of claim 11, wherein the switchable view angle control LCD is configured to have an asymmetric viewing window when operated in the first state.

20. The display system of claim 11, wherein the switchable view angle control LCD includes a hybrid aligned nematic (HAN) liquid crystal cell between a first substrate and a second substrate, and in the first state a first alignment layer of the liquid crystal molecules on the first substrate is a vertical alignment layer and a second alignment layer of the liquid crystal molecules on the second substrate is a planar alignment layer; and the vertical alignment layer has a pretilt in a direction not parallel to the planar alignment layer.

* * * * *